May 19, 1925.  G. H. KRAUSE  1,538,706
PACKING JAR
Filed Feb. 1, 1923  2 Sheets-Sheet 1
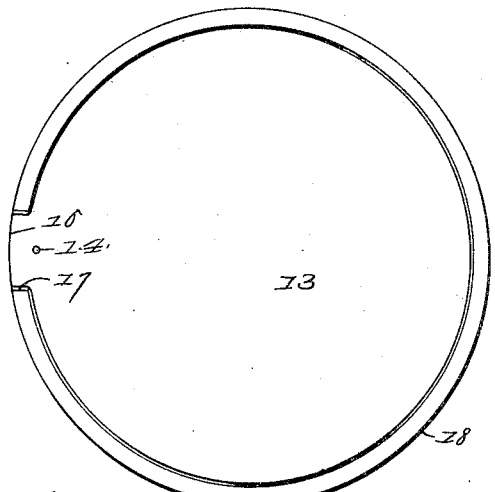
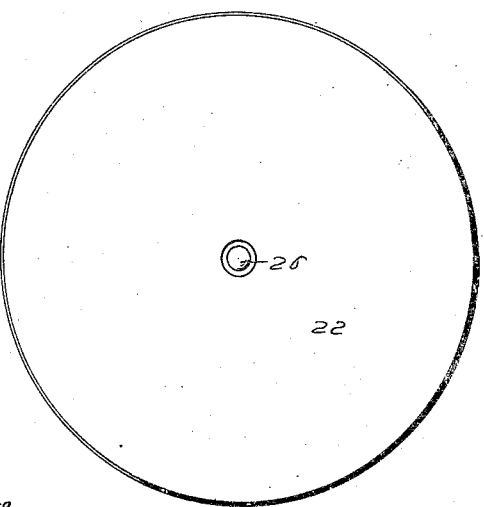
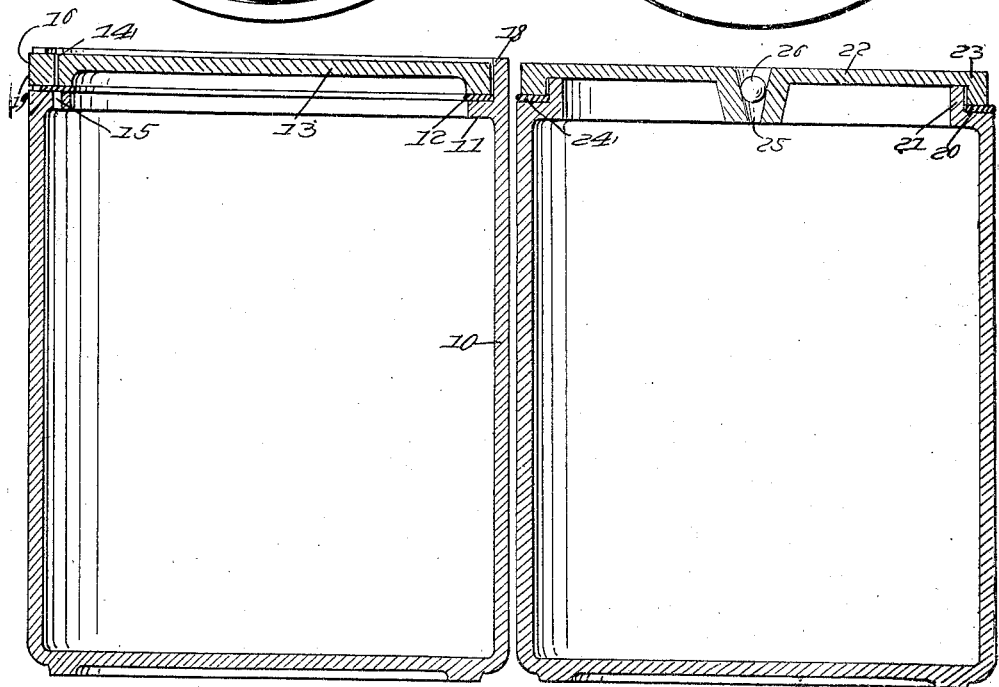
George H. Krause May 19, 1925. 1,538,706
G. H. KRAUSE
PACKING JAR
Filed Feb. 1, 1923 2 Sheets-Sheet 2

Inventor
George H. Krause

Patented May 19, 1925.

1,538,706

UNITED STATES PATENT OFFICE.

GEORGE H. KRAUSE, OF ZANESVILLE, OHIO.

PACKING JAR.

Application filed February 1, 1923. Serial No. 616,330.

*To all whom it may concern:*

Be it known that GEORGE H. KRAUSE, a citizen of the United States, residing at Zanesville, in the county of Muskingum and State of Ohio, has invented new and useful Improvements in Packing Jars, of which the following is a specification.

The object of the invention is to provide an efficient means for packing and preserving perishable articles of food such as vegetables, fruits and the like under conditions insuring the exclusion therefrom of air until access to the receptacle is required in order to remove the contents whether the products are cooked or merely sterilized; and in this connection to provide means whereby access to the contents of the jar will be gained when desired without mutilation of the container or the inconvenience incidental to the removal of sealing means of conventional types; and with these objects in view, the invention consists in a construction and arrangement of parts of which a preferred embodiment is illustrated in the accompanying drawings, wherein:—

Figure 1 is a plan view.

Figure 2 is a vertical sectional view of a jar constructed in accordance with the invention.

Figures 3 and 4 are similar views of a modified construction of the jar.

Figure 5:
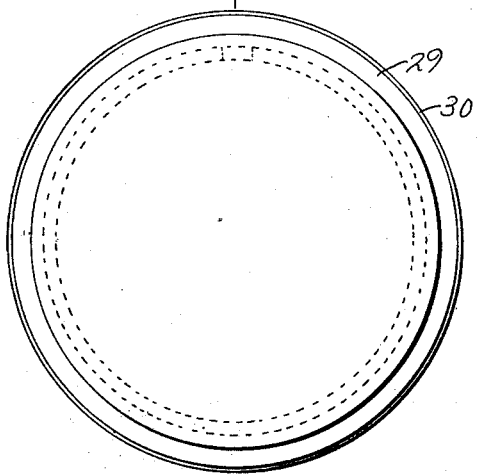
Figure 5 is a top plan view of still another modification.

The principle of operation of a jar constructed in accordance with the invention is that by excluding the air from the top of the vessel or jar by substituting steam therefor during the cooking or heating or sterilizing of the contents of the jar, preferably accomplished while completely submerged in water with the lid or cover of the jar in place, the vacuum or reduction of pressure within the jar due to the condensation of steam as the contents cool, will effectively seal the lid or cover and hold it in place until access to the contents of the receptacle is desired, and in this connection it is proposed to provide a jar having a lid or cover fitted with means whereby the atmospheric pressure may be relieved when it is desired to remove the lid or cover, to the end that such removal may be effected without injury to the receptacle.

In the embodiment of the invention which is illustrated in Figures 1 and 2 the jar body 10 is provided at its upper end with an interior cover seating ledge or flange 11 directed inwardly and disposed below the plane of the upper edge of the wall of the receptacle and adapted to support a gasket 12 of rubber or other yielding or cushioning material to form a seat for the lid or cover 13 which is thus fitted within the upper edge of the receptacle and is protected at its periphery thereby.

At a suitable point in the lid or cover, preferably adjacent to the periphery thereof and also preferably above the seating ledge 11, there is provided a minute perforation 14 extending through the lid or cover and preferably of a diameter not exceeding one-thirty-second of an inch, and correspondingly in the seating ledge 11 and adapted for registration with the perforation 14 there is provided a perforation 15 which, however, may be of slightly larger diameter, as for example one-sixteenth of an inch. This perforation does not extend through the gasket. The perforations respectively in the lid or cover are cut off and held separated by the gasket 12, and when the lid or cover has been sealed by the atmospheric pressure due to the heat or cooking of the contents of the jar, the lid or cover is maintained in its proper seating position until such time as the atmospheric pressure thus created is relieved by puncturing the gasket as by extending a sharp instrument such as a pin or needle, or the equivalent thereof, downwardly through the opening 14 and the opening 15 to admit air to the jar.

In order that the perforations 14 and 15 may be disposed in their proper registering relations when the lid or cover is fitted in place and therefore so that the jar may be opened when desired without inconvenience to the operator there is provided on the jar lid or cover an ear 16 which extends outwardly into a notch or recess 17 in the rim 18 of the jar, said rim being that portion of the jar wall which projects above the plane of the seating ledge 11. As shown, the rim may be cavitied at its inner side as at 19 to receive the ear or tongue 16.

In the construction illustrated in Figures 3 and 4 the seating ledge 20 is arranged exteriorly of the rim 21 and the lid or cover 22 is peripherally flanged as shown at 23 to interlock therewith and thereupon a sealing gasket 24. In this instance the lid or cover is provided with a vent 25 of inwardly tapered form for the reception of a ball valve 26 of rubber or any other material of compressible characteristics adapted to be seated and firmly held in place together with the lid or cover by atmospheric pressure produced as hereinabove explained. Obviously, however, any other style of valve functioning in the same manner may be employed. To gain access to the interior of the jar or to permit of the removal of the jar lid or cover, the valve 26 must be displaced which can be accomplished from the exterior of the receptacle either by puncturing the ball or by the introduction of a sufficiently small instrument to permit of the penetration between the surface of the valve and the wall of the seat.

Figure 6:
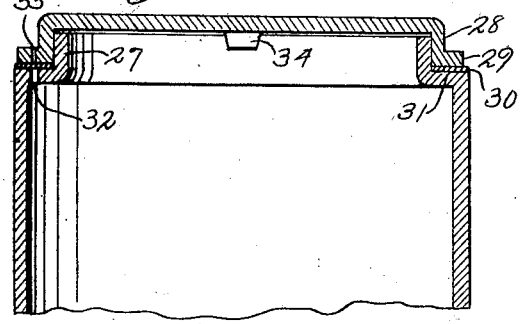
Figure 6 is a vertical sectional view of the upper end of the structure shown in Figure 5 and illustrating the interlocking means between the lid and jar to maintain the relative normal positions of the two.
Figure 7:
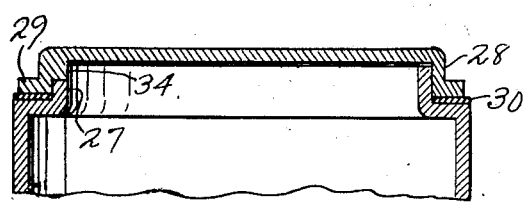
Figure 7 is a section on the line 7—7 of Figure 5.

The modification of the invention shown in Figures 5, 6 and 7 contemplates the formation of the upper end of the jar with an inset upwardly extending flange 27 and a lid having a depending flange 28 disposed in surrounding relation with the flange 27 and an outwardly extending flange 29 seating upon a gasket 30 interposed between the shoulder 31 and the flange 29, the registering holes 32 and 33 being provided in the shoulder 31 and flange 29 for the purpose hereinbefore explained. In order to insure the registration of the holes for the ready perforation of the gasket, the lid is provided with a tongue 34 seating in a corresponding notch in the flange 27.

Figure 8:
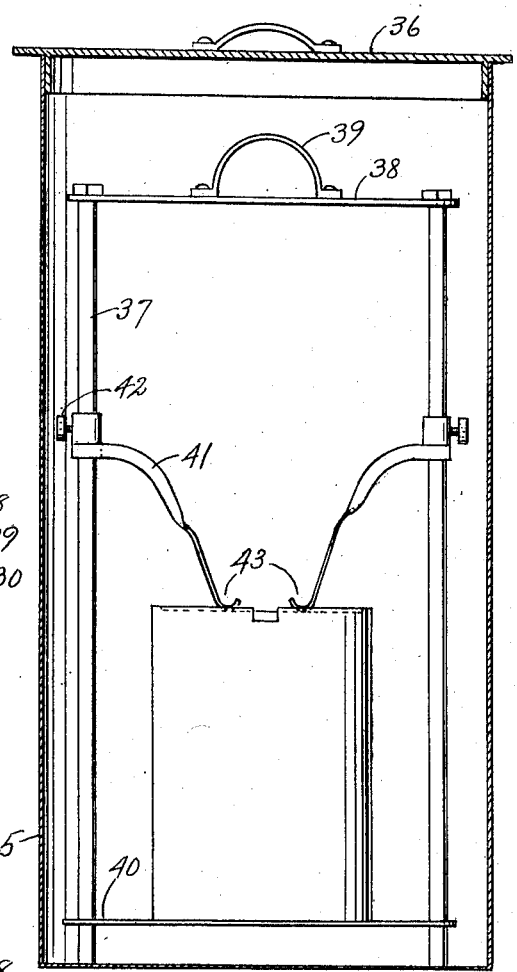
Figure 8 is a view of the convenient form of immersing frame designed for maintaining the proper relation of the lid or cover with the jar body during the sterilizing or cooking operation.

The immersing frame shown in Figure 8 is adapted for disposition in a vessel 35 provided with a removable cover 36, the frame consisting of upright posts 37 spanned by a top plate or yoke 38 having a handle 39 by which the frame may be lowered into or removed from the vessel 35, the base plate 40 of the frame receiving the jar and the post being provided with yieldable arms 41, slidably mounted on the post and held in various positions of adjustment thereon by set screws 42, the feet of the arms bearing on the lid of the jar as indicated at 43. The lid is thus maintained in position on the jar during the cooking operation.

Having described the invention, what is claimed as new and useful is:

1. A packing or preserving jar having an annular seating ledge and a lid or cover for support by said ledge with an interposed cushioning gasket and adapted to be held in place by atmospheric pressure, said lid or cover being provided with an exteriorly accessible vent for the admission of atmospheric pressure and consisting of registrable perforations respectively in the lid or cover and said ledge.

2. A packing or preserving jar having an annular seating ledge and a lid or cover for support by said ledge with an interposed cushioning gasket and adapted to be held in place by atmospheric pressure, said lid or cover being provided with an exteriorly accessible vent for the admission of atmospheric pressure, and consisting of registering openings in the lid and ledge separated by said gasket.

3. A preserving or packing jar having an inturned seating ledge and a lid or cover fitted within the upper edge of the jar and supported by said ledge, the lid and ledge being provided with perforations for registration to permit of puncturing the gasket, and the lid and jar being provided with designating means whereby said perforations may be arranged in registration.

4. A preserving or packing jar having an inturned seating ledge and a lid or cover fitted within the upper edge of the jar and supported by said ledge, the lid and ledge being provided with perforations for registration to permit of puncturing the gasket, the lid and jar being provided with interlocking means for positioning said perforations in registering relation.

5. A preserving or packing jar having an inturned seating ledge and a lid or cover fitted within the upper edge of the jar and supported by said ledge, the lid and ledge being provided with perforations for registration to permit of puncturing the gasket, the lid or cover being provided with a tongue and the rim of the jar with a recess for relatively positioning the said perforations.

In testimony whereof he affixes his signature.

GEORGE H. KRAUSE.